United States Patent [19]

Hall et al.

[11] 3,907,718

[45] Sept. 23, 1975

[54] 2-METHYL-4-PENTENOIC ACID ESTER FRAGRANCE

[75] Inventors: John B. Hall, Rumson; Ching Y. Tseng, Middletown; Manfred Hugo Vock, Locust; Joaquin Vinals, Red Bank, all of N.J.; Edward J. Shuster, Brooklyn, N.Y.

[73] Assignee: International Flavors & Fragrances Inc., New York, N.Y.

[22] Filed: July 22, 1974

[21] Appl. No.: 490,718

[52] U.S. Cl. ......... 252/522; 260/486 R; 260/526 N; 131/17; 424/69; 426/165
[51] Int. Cl.$^2$ ........................................ A61K 7/00
[58] Field of Search ................................... 252/522

[56] References Cited
UNITED STATES PATENTS

| | | | |
|---|---|---|---|
| 3,382,276 | 5/1968 | Schenck et al. | 252/522 |
| 3,493,619 | 2/1970 | Richen et al. | 252/522 |
| 3,499,769 | 3/1970 | Kratz et al. | 260/526 |
| 3,743,657 | 7/1973 | Watanabe et al. | 252/522 |

FOREIGN PATENTS OR APPLICATIONS

| 986,936 | 3/1965 | United Kingdom | 252/522 |
|---|---|---|---|

*Primary Examiner*—Veronica O'Keefe
*Attorney, Agent, or Firm*—A. L. Liberman, Esq.; Harold Haidt, Esq.

[57] ABSTRACT

Methods are described for producing 2-methyl-4-pentenoic acid and $C_2$—$C_6$ alkyl esters thereof comprising first reacting a 1,1,1-triethoxy propane with 2-propenol-1 to form ethyl-2-methyl-4-pentenoate; then in the alternative, (i) using said ethyl-2-methyl-4-pentenoate as such as a flavor or fragrance adjuvant or enhancer, or (ii) saponifying the ethyl-2-methyl-4-pentenoate with base to form a salt of 2-methyl-4-pentenoic acid and then acidifying the salt to form 2-methyl-4-pentenoic acid or (iii) reacting the ethyl-2-methyl-4-pentenoate with a $C_3$—$C_6$ lower alkanol to form a $C_3$—$C_6$ lower alkyl 2-methyl-4-pentenoate, in order to produce:

a. In food flavorings, sweet, fruity, strawberry, winey-cognac, pineapple-like, pear, green, and apple-like aromas and taste; with cooked strawberry jam undertones;

b. In perfumes, fruity, strawberry-like, sweet, cheesy, animal, berry, green, pear and banana notes; and c. In tobaccos, aromatic, sweet, sour, bitter, fruity, green and strawberry notes giving tobacco a "Turkish-like" character.

3 Claims, No Drawings

2-METHYL-4-PENTENOIC ACID ESTER FRAGRANCE

BACKGROUND OF THE INVENTION

The present invention relates to 2-methyl-4-pentenoic acid and $C_2$—$C_6$ alkyl esters thereof produced by, interalia, a novel process and novel compositions using such 2-methyl-4-pentenoic acid and esters to alter the flavor and/or aroma of consumable materials.

There has been considerable work performed related to substances which can be used to impart (or enhance) flavors to (or in) various consumable materials. These substances are used to diminish the use of natural materials, some of which may be in short supply and to provide more uniform properties in the finished product. Sweet, fruity, strawberry, winey-cognac, cooked strawberry jam, pineapple-like, pear, green and apple-like aromas as well as tastes are particularly desirable for many uses in foodstuff flavors. Fruity, strawberry-like, sweet, cheesy, animal, berry, green, pear and banana notes are desirable in several types of perfume compositions. Notes having Turkish-like characteristics as well as aromatic, sweet, sour, bitter, fruity, green and strawberry notes are desirable in tobacco flavoring compositions.

U.S. Pat. No. 3,499,769 issued on Mar. 10, 1970 discloses processes for imparting a fresh fruity flavor (particularly strawberry flavor) to foods by adding a small amount of 2-methyl-2-pentenoic acid to the foodstuff. In U.S. Pat. No. 3,499,769 it is emphasized that the basic nuance imparted by 2-methyl-2-pentenoic acid is a "berry" flavor. Quite unexpectedly, the novel 2-methyl-4-pentenoic acid and esters thereof of the instant invention have properties different in kind from the 2-methyl-2-pentenoic acid of U.S. Pat. No. 3,499,769 which is only fruity and strawberry-like and does not have the sweet, fruity, winey-cognac, pineapple-like, pear, green and apple-like aroma and taste qualities of the 2-methyl-4-pentenoic acid esters of the instant invention.

Arctander, "Perfume and Flavor Chemicals", 1969 discloses the use in perfume compositions and flavors of 4-pentenoic acid, thus:

" . . . only rarely used in perfume compositions mainly on fruity bases and certain artificial essential oils.

"It finds use in flavors on account of its sour-caramellic taste, pleasant at levels below 10 ppm, and including an almost sweet aftertaste. Higher concentrations have acrid taste and repulsively acid odor, pungent and irritating.

"Traces, equivalent to 1 to 5 ppm, are used in imitation butter flavor and in various fruit flavor complexes, e.g., apple, pineapple, apricot and strawberry."

at Volume II, No. 2452. Arctander also discloses the use of trans-2-methyl-2-butenoic acid (tiglic acid) at Vol. II, No. 2949 in perfumery:

"Spicy-rooty, sweet-sour herbaceous odor of moderate tenacity."

and the use of cis-2-methyl-2-butenoic acid (angelic acid) and alkyl esters thereof in perfumes and flavors at Vol. I, No. 238.

The alkenoic acids and esters thereof of the prior art are considered to be different in kind from the 2-methyl-4-pentenoic acid and $C_2$—$C_6$ alkyl esters thereof of the instant invention insofar as their organoleptic properties are concerned.

Rossi and Ingrosse, Chem.Abstr. 69, 95851(g) (Abstract of Gazz.Chim.Ital. 98(7), 866-83 (1968) ) discloses the preparation of 2-methyl-4-pentenoic acid by reacting 3-chlor-propene-1 with 1,1-dicarboethoxyethane.

De Moura Campos and de Amarat, Chem. Abstr. 63: 4159(e) (Abstract of J.Arch.Pharm. 298(2), 92–100 (1965) discloses the preparation of 2-methyl-4-pentenoic acid by the following reaction sequence:

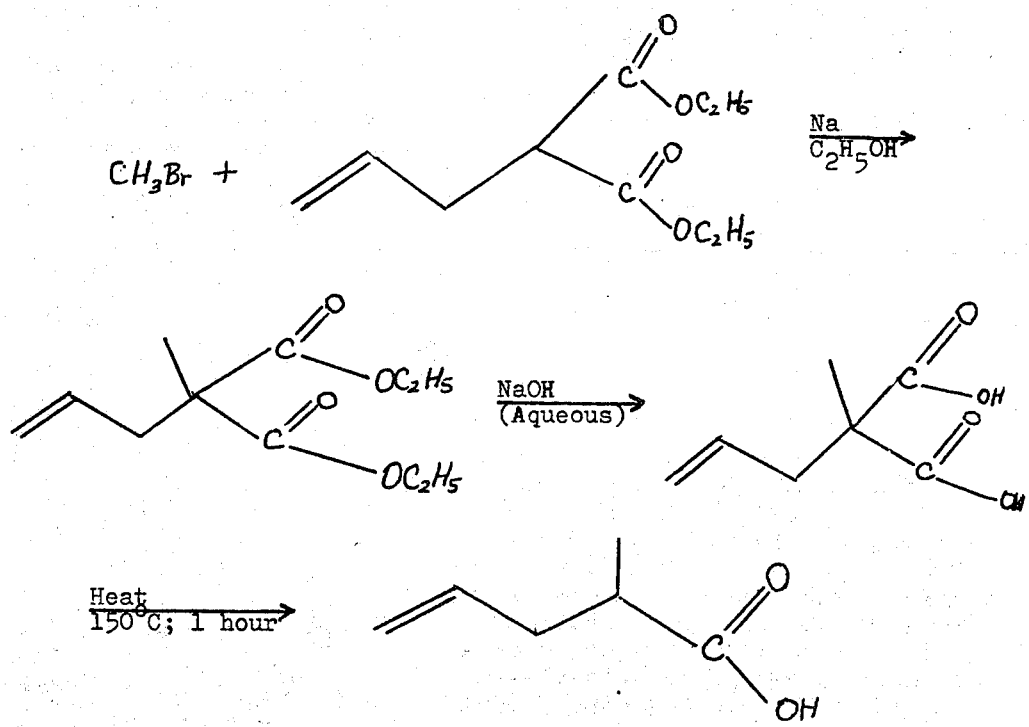

Trace and Gurante, Chem. Abstr. 55:14324(i) (Abstract of Rend.Inst.Lombardo Sci. Pt.I, Classe Sci. Mat. e Nat., 94A, 309-330 (1960) discloses a process for preparing 2-methyl-4-pentenoic acid by reacting 2-cyclopropyl-propionic acid with HBr.

Adler and Brachel Chem.Abstr. 57: 2042(d) (Abstract of Ann. 651, 141-53 (1962) sets forth a process for giving 12% yields of methyl-2-methyl-4-pentenoate by means of the following reaction:

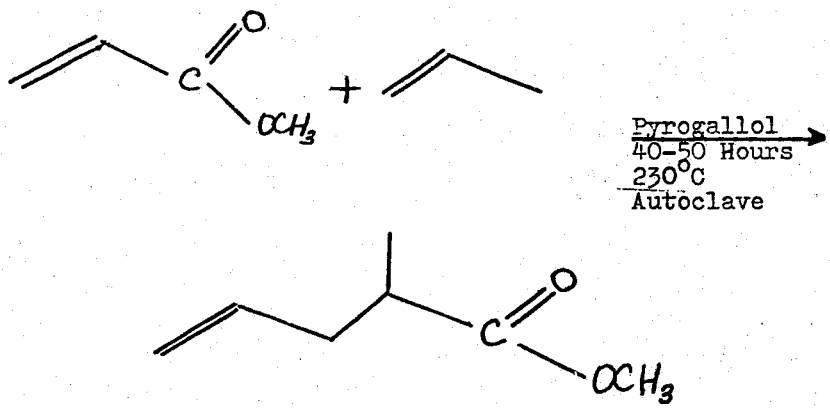

These processes as well as other processes of the prior art have not been found to have lower commercial feasibility in view of the complexity and/or cost of carrying out the particular reaction involved; as distinguished from the novel process of our invention.

THE INVENTION

It has now been discovered that novel solid and liquid foodstuff and flavoring compositions having sweet, fruity, strawberry, winey-cognac, pineapple-like, pear, green, and apple-like aromas and tastes, with cooked strawberry jam undertones; novel perfume compositions having fruity, strawberry-like, sweet, cheesy, animal, berry, green, pear and banana notes; as well as novel tobacco flavoring compositions capable of imparting a Turkish-like character to tobacco, and having aromatic, sweet, sour, bitter, fruity, green and strawberry notes may be provided by the utilization of 2-methyl-4-pentenoic acids and $C_2$—$C_6$ alkyl esters thereof having the generic formula:

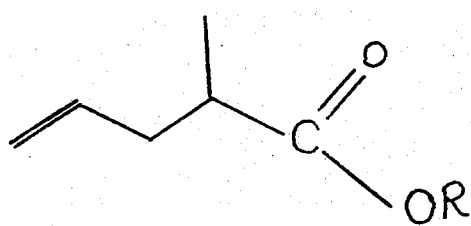

wherein R is hydrogen, or one of $C_2$—$C_6$ alkyl in foodstuffs, perfume compositions, perfumed articles, colognes and tobaccos as well as tobacco substitutes.

The 2-methyl-4-pentenoic acid and $C_2$—$C_6$ alkyl esters thereof, so useful, may be produced, preferably, according to the novel process our invention comprising the steps of first reacting a 1,1,1-trilower alkoxy propane with 2-propenol-1 to form ethyl-2-methyl-4-pentenoate; then, in the alternative, (i) using the thus-formed ethyl-2-methyl-4-pentenoate as such for its own organoleptic characteristics as a flavor or fragrance adjuvant or enhancer, or (ii) saponifying the ethyl-2-methyl-4-pentenoate with base to form a salt of 2-methyl-4-pentenoic acid and then acidifying the salt of 2-methyl-4-pentenoic acid with acid to form 2-methyl-4-pentenoic acid itself and either using the said 2-methyl-4-pentenoic acid for its own organoleptic characteristics as a flavor or fragrance adjuvant, or esterifying the 2-methyl-4-pentenoic acid with a $C_3$—$C_6$ alkanol to form a $C_3$—$C_6$ alkyl ester of 2-methyl-4-pentenoic acid or (iii) reacting the ethyl-2-methyl-4-pentenoate with a $C_3$—$C_6$ lower alkanol to form a $C_3$—$C_6$ lower alkyl 2-methyl-4-pentenoate.

The 2-methyl-4-pentenoic acid and $C_2$—$C_6$ lower alkyl esters of 2-methyl-4-pentenoic acid of our invention having the generic formula:

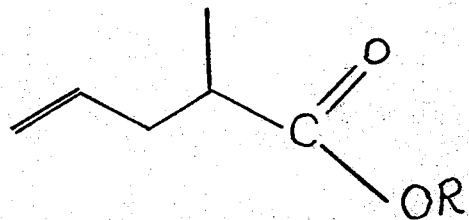

wherein R is hydrogen, or one of $C_2$—$C_6$ alkyl are intended to include singly, and in admixture the two stereoisomers of 2-methyl-4-pentenoic acid and its $C_2$—$C_6$ esters, having the structures:

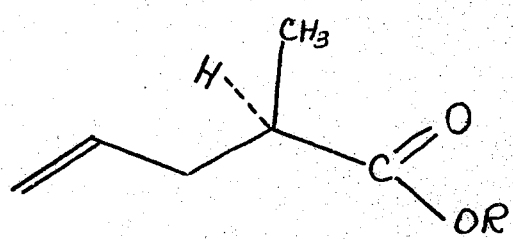

and

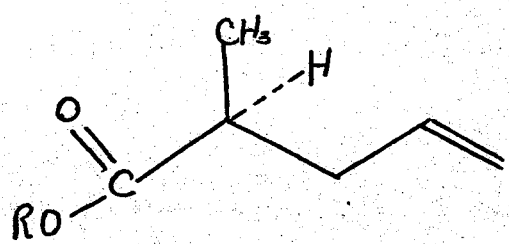

wherein R is hydrogen or $C_2$—$C_6$ lower alkyl.

Thus, the 2-methyl-4-pentenoic acid and $C_2$—$C_6$ alkyl esters thereof of our invention are capable of supplying and/or potentiating certain flavor and aroma notes usually lacking in many fruit flavors as well as Turkish tobacco flavors heretofore provided. Furthermore, the 2-methyl-4-pentenoic acid and $C_2$—$C_6$ alkyl esters thereof of our invention are capable of supplying certain fragrance notes usually lacking in many perfumery materials, for example, strawberry fragrances.

The novel process of our invention involves the steps of:

a. First reacting 1,1,1-triethoxypropane with 2-propenol-1 in the presence of a phosphoric acid catalyst to form ethyl-2-methyl-4-pentenoate. The reaction temperature range is 100–225°C with a range of 140–180°C being preferred. The mole ratio of reactants preferred is 1:1, with a large excess of 2-propenol-1 undesirable and a large excess of triethoxypropane being uneconomical. The reaction time is inversely dependent upon the temperature of reaction. Thus, for example, where the temperature range of reaction is 165–185°C, the reaction time is approximately 3 hours. As stated, supra, the reaction product, ethyl-2-methyl-4-pentenoate may be used as is, or it may further be reacted as in step (b) or (c), set forth infra; but in any event, the reaction product is "worked-up" by first neutralizing the acid catalyst, the phosphoric acid, using base (e.g., sodium bicarbonate) and then fractionally distilling the reaction product.

b. If desired, the resulting ethyl-2-methyl-4-pentenoate may be converted into 2-methyl-4-pentenoic acid by the standard saponification and acidification reactions. The saponification is preferably carried out using strong aqueous base, e.g., 50% aqueous sodium hydroxide or 50% aqueous potassium hydroxide admixed with methanol. After acidification of the resulting salt of 2-methyl-4-pentenoic acid (e.g., the sodium or potassium salt) using mineral acid (e.g., 6 molar aqueous hydrochloric acid) the 2-methyl-4-pentenoic acid is extracted from the aqueous phase using an organic solvent such as toluene. The organic solvent is then stripped from the acid and the acid is fractionally distilled. The resulting acid may be used as such, or it may, if desired by esterified with a $C_3$—$C_6$ alkanol to form an ester of 2-methyl-4-pentenoic acid.

c. If desired, the ethyl-2-methyl-4-pentenoate produced as set forth in (a), supra, may be converted into another ester, a $C_3$, $C_4$, $C_5$ or $C_6$ ester of 2-4-pentenoic acid, by reaction with a $C_3$, $C_4$, $C_5$ or $C_6$ alkanol in the presence of a protonic acid catalyst at a temperature in the range of 100–170°C. The preferable temperature depends upon the particular alkanol used; e.g., about 100°C in the case of isobutyl alcohol; and 140–150°C in the case of n-hexanol. The preferred catalyst is paratoluene sulfonic acid.

The foregoing series of reactions may be illustrated as follows:

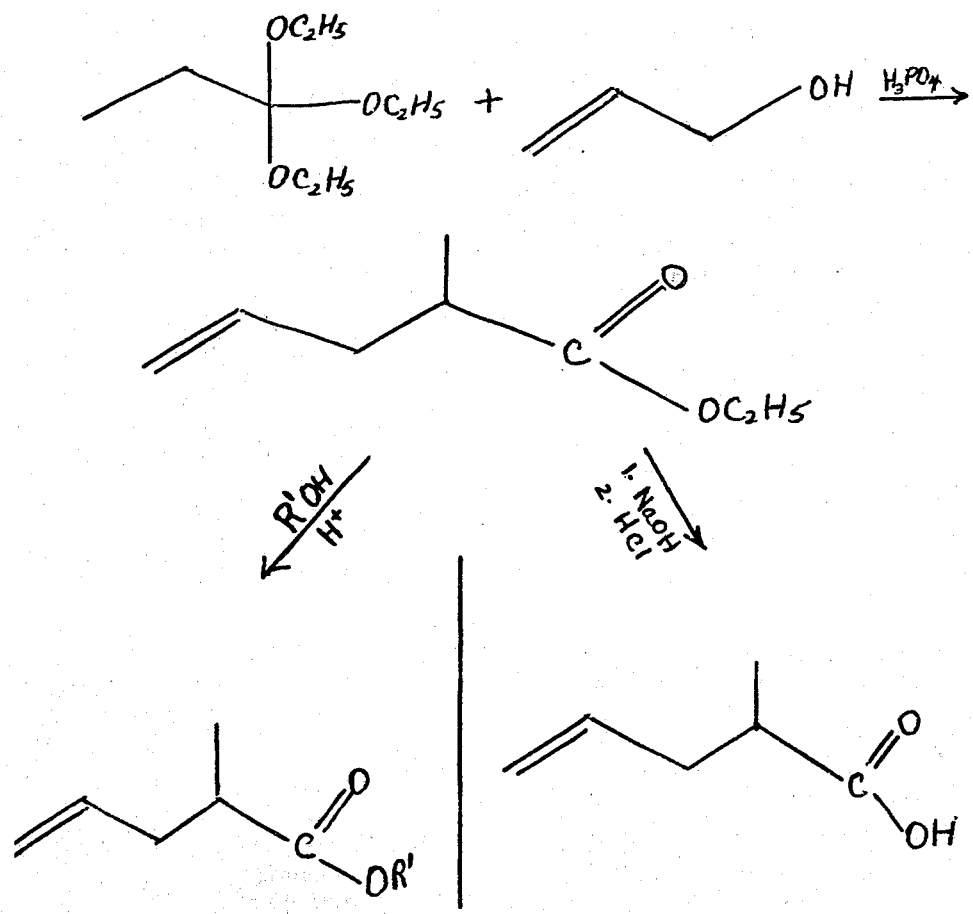

wherein R' is $C_3$—$C_6$ lower alkyl.

Examples of specific reaction products, the uses of which are contemplated within the scope of our invention, and their respective organoleptic properties are set forth in the following table:

| Compound | | Organoleptic Properties |
|---|---|---|
| Ethyl-2-methyl-3-pentenoate | (i) | Food Flavor: At 0.05 ppm, fresh, sweet, fruity; at 0.1 ppm, very pleasant strawberry, winey; at 0.2 ppm, wine, pineapple-like: at 0.5 ppm, strawberry, apple, fruity; at 1 ppm, green, fruity; at 2 ppm, green, apple. |
| | (ii) | Fragrance: Green, sweet notes; fruity and strawberry notes. |
| | (iii) | Tobacco Flavor: Sweet, fruity, strawberry-like and slightly green aroma. At 100 ppm and 200 ppm, on smoking, more aromatic, less harsh, Turkish tobacco-like. |
| 2-Methyl-4-pentenoic acid | (i) | Food Flavor: Cooked strawberry jam type aroma and taste at 10 ppm. |
| | (ii) | Fragrance: Cheesy, slight animal, sweet, berry notes. |
| | (iii) | Tobacco Flavor: Pungent, sweet, fruity, sour and green notes. At 100 ppm and 200 ppm on smoking, sweeter and Oriental, Turkish-like aroma. |
| Isobutyl-2-methyl-4-pentenoate | (i) | Food Flavor: At 5 ppm, fruity, pineapple and strawberry aroma and fruity, pineapple, strawberry and sweet taste. |
| | (ii) | Fragrance: A green, sweet, fruity and berry note. |
| n-Hexyl-2-methyl-4-pentenoate | (i) | Food Flavor: At 5 ppm, pear and green aroma and taste notes. |
| | (ii) | Fragrance: A green, floral, slight fruity-apple, pear and banana note. |

When the 2-methyl-4-pentenoic acid or $C_2$—$C_6$ alkyl ester thereof of our invention are used as food flavor adjuvants, the nature of the co-ingredients included with the said 2-methyl-4-pentenoic acid or $C_2$—$C_6$ alkyl ester thereof in formulating the product composition will also serve to alter the organoleptic characteristics of the ultimate foodstuff treated therewith.

As used herein in regard to flavors, the term "alter" in its various forms means "supplying or imparting flavor character or note to otherwise bland, relatively tasteless substances or augmenting the existing flavor characteristic where a natural flavor is deficient is some regard or supplementing the existing flavor impression to modify its quality, character or taste". As used herein, the term "foodstuff" includes both solids and liquids ingestible materials which usually do, but need not, have nutritional value. Thus, foodstuffs include soups, convenience foods, beverages, dairy products, candies, vegetables, cereals, soft drinks, snacks and the like.

Substances suitable for use herein as co-ingredients or flavoring adjuvants are well known in the art for such use being extensively described in the relevant literature. Apart from the requirement that any such material be "ingestibly" acceptable and thus non-toxic or otherwise non-deleterious nothing particularly critical resides in selection thereof. Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxyanisole (mixture of 2 and 3 tertiary-butyl-4-hydroxyanisole), butylated hydroxy toluene (2,6-di-tertiarybutyl-4-methyl phenol), propyl gallate and the like and sequestrants, e.g., citric acid.

Thickener compounds include carriers, binders, protective colloids, suspending agents, emulsifiers and the like, e.g., agaragar, carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches pectins, and emulsifiers, e.g., mono-and diglycerides of fatty acids, skim milk powder, hexoses, pentoses, disaccharides, e.g., sucrose corn syrup and the like.

Surface active agents include emulsifying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogenated tallow alcohol and the like.

Conditioners, include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcuma and the like; firming agents such as aluminum sodium sulfate, calcium chloride and calcium gluconate; texturizers, anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, and 2-methyl-3-pentenoic acid; ketones and aldehydes, e.g., acetaldehyde, acetophenone, acetone, acetyl methyl carbinol, acrolein, n-butanal, crotonal, diacetyl, beta, beta-dimethyl-acrolein, n-hexanal, 2-hexenal, cis-3-hexenal, 2-heptanal, 4-(p-hydroxyphenyl)-2-butanone, alpha-ionone, beta-ionone, methyl-3-butanone, 2-pentanone, 2-pentenal and propanal; alcohols, such as 1-butanal, benzyl alcohol, 1-borneol, trans-2-buten-1-ol, ethanol, geraniol, 1-hexanal, 2-heptanol, trans-2-hexanol-1, cis-3-hexen-1-ol, 3-methyl-3-buten-1-ol, 1-pentenol, 1-penten-3-ol, p-hydroxyphenyl-2-ethanol, isoamyl alcohol, isofenchyl alcohol, phenyl-2-ethanol, alpha-terpineol, cisterpineol hydrate; esters, such as butyl acetate, ethyl acetate, ethyl acetoacetate, ethyl benzoate, ethyl butyrate, ethyl caproate, ethyl cinnamate, ethyl crotonate, ethyl formate, ethyl isobutyrate, ethyl isovalerate, ethyl alpha-methylbutyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alphamethylbutyrate, propyl acetate, amyl acetate, amyl butyrate, benzyl salicylate, dimethyl anthranilate, ethyl methylphenylglycidate, ethyl succinate, isobutyl cinnamate and terpenyl acetate; essential oils, such as jasmine absolute, rose absolute, orris absolute, lemon essential oil, bulgarian rose, yara yara, natural raspberry oil and vanilla; lactones; sulfides, e.g., methyl sulfide and other materials such as maltol, acetoin and acetals (e.g., 1,1-diethoxyethane, 1,1-dimethoxyethane and dimethoxymethane.

The specific flavoring adjuvant selected for use may be either solid or liquid depending upon the desired physical form of the ultimate product, i.e., foodstuff, whether simulated or natural, and should, in any event, be capable of providing an environment in which the 2-methyl-4-pentenoic acid or $C_2$—$C_6$ alkyl ester thereof can be dispersed or admixed to provide a homogeneous medium. In addition, selection of one or more flavoring adjuvants, as well as the quantities thereof, will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2-methyl-4-pentenoic acid or $C_2$—$C_6$ alkyl ester thereof employed in a particular instance can vary over a relatively wide range whereby to its desired organoleptic effects having reference to the nature of the product are achieved. Thus, correspondingly, greater amounts would be necessary in those instances wherein the ultimate food composition to be flavored is relatively bland to the taste, whereas relatively mino quantities may suffice for purposes of enhancing the composition merely deficient in natural flavor or aroma. The primary requirement is tht the amount selected to be effective, i.e., sufficient to alter the organoleptic characteristics of the parent composition, whether foodstuff per se or flavoring composition.

The use of insufficient quantities of 2-methyl-4-pentenoic acid or $C_2$—$C_6$ alkyl ester thereof will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of 2-methyl-4-pentenoic acid or $C_2$—$C_6$ alkyl ester thereof ranging from a small but effective amount, e.g., 0.03 parts per million up to about 20 parts per million by weight based on total composition are suitable. Concentrations in excess of the maximum quantity stated are not normally recommended since they fail to prove commensurate enhancement of organoleptic properties. In those instances wherein the 2-methyl-4-pentenoic acid or $C_2$—$C_6$ alkyl ester thereof is added to the foodstuff as an integral component of a flavoring composition, it is, of course, essential that the total quantity of flavoring composition employed be sufficient to yield an effective 2-methyl-4-pentenoic acid or $C_2$—$C_6$ alkyl ester thereof concentration in the foodstuff product.

Food flavoring compositions prepared in accordance with the present invention preferably contain the 2-methyl-4-pentenoic acid or $C_2$—$C_6$ alkyl ester thereof in concentrations ranging from about 0.25% up to about 15% by weight based on the total weight of said flavoring composition.

The compositions described herein can be prepared according to conventional techniques well known as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the 2-methyl-4-pentenoic acid or $C_2$—$C_6$ alkyl ester thereof with for example gum arabic, gum tragacanth, carrageenan and the like, and thereafter spray-drying the resultant mixture whereby to obtain the particular solid product. Pre-prepared flavor mixes in powder form, e.g., a fruit-flavored powder mix are obtained by mixing the dried solid components, e.g., starch, sugar, and the like and 2-methyl-4-pentenoic acid or $C_2$—$C_6$ alkyl ester thereof in a dry blender until the requisite degree of uniformity is achieved.

It is presently preferred to combine with the 2-methyl-4-pentenoic acid or $C_2$—$C_6$ alkyl ester thereof the following adjuvants:

p-Hydroxybenzylacetone;
Geraniol;
Maltol;
Ethyl methyl phenyl glycidate;
Benzyl acetate;
Vanillin;
Methyl cinnamate;
Ethyl pelargonate;
Methyl anthranilate;
Isoamyl acetate;
Alpha ionone;
Ethyl butyrate;
Gamma-undecalactone;
Naphthyl ethyl ether;
Diacetyl;
Ethyl acetate;
Anethole;
Isoamyl butyrate;
Cis-3-hexenol-1;
2-Methyl-2-pentenoic acid;
Elemecine (4-allyl-1,2,6-trimethoxy benzene);
Isoelemecine (4-propenyl-1,2,6-trimethoxy benzene).

An additional aspect of our invention provides an organoleptically improved smoking tobacco product and additives therefor, as well as methods of making the same which overcome specific problems heretofore encountered in which specific desired Turkish and/or Oriental flavor characteristics of tobacco are created or enhanced and may be readily controlled and maintained at the desired uniform level regardless of variations in the tobacco components of the blend.

This invention further provides improved tobacco additives and methods whereby various desirable Turkish and/or Oriental flavoring characteristics may be imparted to smoking tobacco products and may be readily varied and controlled to produce the desired uniform flavoring characteristics.

In carrying out this aspect of our invention we add to smoking tobacco materials or a suitable substitute therefor (e.g., dried lettuce leaves) an aroma and flavor additive containing as an active ingredient one or both of the following materials:

i. 2-Methyl-4-pentenoic acid;
ii. Ethyl-2-methyl-4-pentenoate

In addition to the 2-methyl-4-pentenoic acid and/or ethyl-2-methyl-4-pentenoate of our invention other flavoring and aroma additives may be added to the smoking tobacco material or substitute therefor either separately or in mixture with the 2-methyl-4-pentenoic acid and/or ethyl-2-methyl-4-pentenoate as follows:

I. SYNTHETIC MATERIALS

Beta-Ethyl-Cinnamaldehyde
Eugenol
Dipentene
Maltol
Ethyl Maltol
Delta Undecalactone
Delta Decalactone
Benzaldehyde
Amyl Acetate
Ethyl Butyrate
Ethyl Valerate
Ethyl Acetate
2-Hexenol-1,2-methyl-5-isopropyl-1,3-nonadiene-8-one
2,6-Dimethyl-2,6-undecadiene-10-one
2-Methyl-5-isopropyl acetophenone
2-Hydroxy-2,5,5,8a-tetramethyl-1-(2-hydroxyethyl0-decahydronaphthalene
Dodecahydro-3a-6,6,9a-tetramethyl naphtho-(2,1-b)-furan
4-Hydroxy hexanoic acid, gamma lactone
Polyisoprenoid hydrocarbons defined in Example V of U.S. Pat. No. 3,589,372 issued on June 29, 1971

II. NATURAL OILS

Celery seed oil
Coffee extract
Bergamot oil
Cocoa extract
Nutmeg oil
Origanum oil An aroma and flavoring concentrate containing 2-methyl-4-pentenoic acid and/or ethyl-2-methyl-4-pentenoate and, if desired, one or more of the above indicated additional flavoring additives may be added to the smoking tobacco material, to the filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives may be varied in accordance with taste but insofar as enhancement or the imparting of natural and/or sweet notes, we have found that satisfactory results are obtained if the proportion by weight of the sum total of 2-methyl-4-pentenoic acid and/or ethyl-2-methyl-4-pentenoate to smoking tobacco material is between 50 ppm and 250 ppm (0.005%–0.25%) of the active ingredients to the smoking tobacco material. We have further found that satisfactory results are obtained if the proportion by weight of the sum total of 2-methyl-4-pentenoic acid and/or ethyl-2-methyl-4-pentenoate used to flavoring material is between 0.02 % and 5%.

Any convenient method for incorporating the 2-methyl-4-pentenoic acid and/or ethyl-2-methyl-4-pentenoate in the tobacco product may be employed. Thus, the 2-methyl-4-pentenoic acid and/or ethyl-2-methyl-4-pentenoate taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of the 2-methyl-4-pentenoic acid and/or ethyl-2-methyl-4-pentenoate taken alone or taken further together with other flavoring additives as set forth above, may be applied by means of a suitable applicator such as a brush or roller on the paper or leaf wrapper for the smoking product, or it may be applied to the filter by either spraying, or dipping or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the 2-methyl-4-pentenoic acid and/or ethyl-2-methyl-4-pentenoate in excess of the amounts or concentrations above indicated so that when blended with other tobaccos, the final product will have the percentage within the indicated range.

In accordance with one specific example of our invention an aged, cured and shredded domestic burley tobacco is spread with a 20% ethyl alcohol solution of a mixture of 50% 2-methyl-4-pentenoic acid and 50% ethyl-2-methyl-4-pentenoate in an amount to provide a tobacco composition containing 100 ppm by weight of 2-methyl-4-pentenoic acid and 100 ppm by weight of ethyl-2-methyl-4-pentenoate on a dry basis. Thereafter, the alcohol is removed by evaporation and the tobacco is manufactured into cigarettes by the usual techniques. The cigarette when treated as indicated has a desired and pleasing aroma which is detectable in the main and side streams when the cigarette is smoked. This aroma is described as a "Turkish/Oriental" tobacco aroma.

While our invention in particularly useful in the manufacture of smoking tobacco, such as cigarette tobacco, cigar tobacco and pipe tobacco, other tobacco products formed from sheeted tobacco dust or fines may also be used. Likewise, the 2-methyl-4-pentenoic acid and/or ethyl-2-methyl-4-pentenoate of our invention can be incorporated with materials such as filter tip materials, seam paste, packaging materials and the like which are used along with tobacco to form a product adapted for smoking. Furthermore, the 2-methyl-4-pentenoic acid and/or ethyl-2-methyl-4-pentenoate can be added to certain tobacco substitutes of natural or synthetic origin (e.g., dried lettuce leaves) and, accordingly, by the term "tobacco" as used throughout this specification is meant any composition intended for human consumption by smoking or otherwise, whether composed of tobacco plant parts or substitute materials or both.

The 2-methyl-4-pentenoic acid or $C_2$—$C_6$ alkyl ester thereof and one or more auxiliary perfume ingredients, including, for example, alcohols, aldehydes, nitriles, esters, cyclic esters and natural essential oils, may be admixed so that the combined odors of the individual components produce a pleasant and desired fragrance, particularly and preferably in strawberry fragrances. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual components which contribute its particular olfactory characteristics, but the over-all effect of the perfume composition will be the sum of the effects of each of the ingredients. Thus, the 2-methyl-4-pentenoic acid or $C_2$—$C_6$ alkyl ester thereof can be used to alter the aroma characteristics of a perfume composition, for example, by utilizing or moderating the olfactory reaction contributtd by another ingredient in the composition.

The amount of 2-methyl-4-pentenoic acid or $C_2$—$C_6$ alkyl ester thereof of our invention which will be effective in perfume compositions depends on many factors, including the other ingredients, their amounts and the effects which are desired. It has been found that perfume compositions containing as little as 0.1% of 2-methyl-4-pentenoic acid or $C_2$—$C_6$ alkyl ester thereof or even less (e.g., 0.05%) can be used to impart a scent odor to soaps, cosmetics or other products. The amount employed can range up to 10% of the fragrance components and will depend on considerations of cost, nature of the end product, the effective desired on the finished product and the particular fragrance sought.

The 2-methyl-4-pentenoic acid or $C_2$—$C_6$ alkyl ester thereof is useful, taken alone or in perfume compositions as an olfactory component in detergents and soaps, space odorants and deodorants, perfumes, colognes, toilet water, bath perparations, such as bath oils, and bath solids; hair preparations, such as lacquers, brilliantines, pomades and shampoos; cosmetic preparations, such as creams, deodorants, hand lotions and sun screens; powders, such as talcs, dusting powders, face powders and the like. When used as an olfactory component as little as 0.1% of 2-methyl-4-pentenoic acid or $C_2$—$C_6$ alkyl ester thereof will suffice to impart a sweet, green topnote or a green, tart, seed note to strawberry perfume formulations or a fruity, fatty, middle note fullness to lavender perfume formulations. Generally, no more than 1.5% of 2-methyl-4-pentenoic acid or $C_2$—$C_6$ alkyl ester thereof based on the ultimate end product is required in the perfume composition.

In addition, the perfume composition or fragrance composition of our invention can contain a vehicle, or carrier for the 2-methyl-4-pentenoic acid or $C_2$—$C_6$ alkyl ester thereof. The vehicle can be a liquid such as an alcohol, a non-toxic alcohol, a non-toxic glycol, or the like. The carrier can also be an absorbent solid, such as a gum (e.g., gum arabic) or components for encapsulating the composition (such as gelatin).

It will thus be apparent that 2-methyl-4-pentenoic acid or $C_2$—$C_6$ alkyl ester thereof can be utilized to alter the sensory properties, particularly organoleptic properties, such as flavor and/or fragrance of a wide variety of consumable materials.

The following examples are given to illustrate embodiments of the invention as it is presently preferred to practice it. It will be understood that these examples are illustrative, and the invention is not to be considered as restricted thereto except as indicated in the appended claims. All parts and percentages given herein are by weight unless otherwise specified.

EXAMPLE I

Preparation of Ethyl-2-Methyl-4-Pentenoate

To a two liter autoclave, the following materials are added:

| | |
|---|---|
| Triethyl orthopropionate (1,1,1-triethoxypropane) | 495 g (2.4 moles) |
| Allyl alcohol | 140 g (2.4 moles) |
| Phosphoric acid (85%) | 12 g |

The autoclave is sealed and the mixture is heated with stirring at 165°–185°C for a period of 3 hours.

The autoclave is then opened and 12.6 g sodium bicarbonate is added to the reaction mass in order to neutralize the phosphoric acid. 30 g. Primol (a registered trademark for mineral oil manufactured by the Exxon Co. of Linden, N.J.) is then added as a still base, and the reaction mass is fractionally distilled on a 1 × 20 inches packed Goodloe distillation column (i) at atmospheric pressure and 129°C (yielding a mixture of ethanol and ethyl propionate (245 g.) and (ii) at 40 mm Hg. pressure and 75°C (yielding 264 g. of ethyl-2-methyl-4-pentenoate. Yield, based on triethyl orthopropionate used, 73.5%.

Mass spectral analysis: m/e = 69, 41, 29, 27 39 and 68.

EXAMPLE II

Preparation of 2-Methyl-4-Pentenoic Acid

Into a 250 ml flask equipped with magnetic stirrer, the following materials are added:

| | |
|---|---|
| Ethyl-2-methyl-4-pentenoate (prepared according to Example I) | 80 g |
| 50% Aqueous NaOH | 70 g |
| Methanol | 100 ml |

Over a four-hour period, the mixture is stirred at 30°–50°C. At the end of the four-hour period, 200 ml water is added to the reaction mass.

The reaction mass is then extracted with three 200 ml portions of toluene. The aqueous layer is acidified and re-extracted with two 100 ml portions of toluene. The toluene extracts are combined and washed with three 50 ml portions of 20% aqueous NaCl followed by one 40 ml portion of 10% sodium acetate. The reaction product so treated is then evaporated to remove the toluene solvent. It is then fractionally distilled using a semi-micro still at 72°–74°C and 5 mm Hg. pressure.

EXAMPLE III

Preparation of Isobutyl-2Methyl-4-Pentenoate

Into a 500 ml reaction vessel equipped with stirrer, 3 inch splash column and thermometer, the following materials are added:

| | |
|---|---|
| Ethyl-2-methyl-4-pentenoate (Produced according to Example I) | 56 g (0.4 moles) |
| Isobutyl Alcohol | 112 g |
| p-Toluene sulfonic acid | 0.5 g |
| Primol | 10 g |
| Ionol (A registered trademark for butylated hydroxytoluene manufactured by the Shell Chemical Company) | 0.1 g |

The reaction mass is heated to 100°C and atmospheric temperature for a period of 10 hours, while distilling off light fractions (head temperature: 45°–83°C). After the ten-hour period, 72.4 g light fractions are distilled.

Vacuum is then applied and the remaining unreacted isobutyl alcohol is distilled. The residual product is then rushed over yielding a mixture of isobutyl-2-methyl-4-pentenoate and ethyl-2-methyl-4-pentenoate. This mixture is refractionated through a 12 plate Vigreaux column at 95°–96°C and 40 mm Hg pressure yieldinng isobutyl-2-methyl-4-pentenoate.

EXAMPLE IV

Preparation of n-Hexyl-2-Methyl-4-Pentenoate

Into a 250 ml reaction vessel equipped with stirrer, 3 inch splash column and thermometer, the following materials are added:

| | |
|---|---|
| Ethyl-2-methyl-4-pentenoate (Prepared according to Example I) | 56 g (0.4 moles) |
| n-Hexyl Alcohol | 60 g |
| p-Toluene Sulfonic Acid | 0.4 g |
| Primol | 10 g |
| Ionol | 0.1 g |

The reaction mass is heated to 140°–150°C at atmospheric pressure over a period of 18 hours, while distilling off light fractions. By the end of the 18-hour period, 11.7 g of low boilers is distilled. The residual product is then rushed over, and then fractionated on a 12 plate Vigreaux column at 88°C and 3.9–4.1 mm Hg. pressure to yield the n-hexyl-2-methyl-4-pentenoate.

EXAMPLE V

Strawberry Flavors

The following basic strawberry flavor is prepared:

| Ingredients | Parts by Weight |
|---|---|
| p-Hydroxybenzylacetone | 2 |
| Vanillin | 15 |
| Maltol | 20 |
| Ethyl methylphenyl glycidate | 15 |
| Benzyl acetate | 20 |
| Ethyl butyrate | 10 |
| Methyl cinnamate | 5 |
| Methyl anthranilate | 5 |
| Alpha-ionone | 1 |
| Gamma-undecalactone | 2 |
| Diacetyl | 2 |
| Anethole | 1 |
| Cis-3-hexenol | 17 |
| Ethanol (95% aqueous) | 385 |
| Propylene glycol | 500 |

To one third of this flavor, ethyl-2-methyl-4-pentenoate (prepared according to Example I) is added at the rate of 1%. To another third of this flavor, 2-methyl-4-pentenoic acid (prepared according to Example II) is added at the rate of 8%. The third portion of this flavor is kept "as is". The three flavors thus produced are compared at the rate of 0.005% (50 ppm) in water by a bench panel.

The flavor containing the ethyl-2-methyl-4-pentenoate is found to have a more fresh natural strawberry-like aroma and taste than the basic flavor formulation. The flavor containing the 2-methyl-4-pentenoic acid also was found to have a more natural strawberry-like aroma and taste; especially a preferred, sweet, fresh, strawberry-like aroma, and is preferred over the basic flavor formulation.

EXAMPLE VI

The following concentrate is prepared:

| Ingredient | Percent |
|---|---|
| Geraniol | 1.00 |
| Ethyl methyl phenyl glycidate | 3.50 |
| Isobutyl-2-methyl-4-pentenoate (Prepared according to the process of Example III) | 5.00 |
| Vanillin | 5.50 |
| Ethyl pelargonate | 13.00 |
| Isoamyl acetate | 14.00 |
| Ethyl butyrate | 58.00 |
| | 100.00 |

EXAMPLE VII

Another concentrate is prepared as follows:

| Ingredient | Percent |
|---|---|
| Naphthyl ethyl ether | 1.0 |
| Vanillin | 2.5 |
| Ethyl methyl phenyl glycidate | 3.0 |
| Isobutyl-2-methyl-4-pentenoate (Prepared according to the process of Example III) | 5.0 |
| Ethyl acetate | 9.5 |
| Isoamyl acetate | 12.0 |
| Ethyl butyrate | 26.0 |
| Isoamyl butyrate | 41.0 |
| | 100.00 |

EXAMPLE VIII

The concentrate prepared in Example VI is dissolved in 4 volumes of propylene glycol and the mixture is added to a hard candy melt at the rate of 1.5 oz. of the concentrate solution per 100 lbs. of melt. After the finished candy has been produced, it is found to have an excellent strawberry flavor. When the candy is compared with candy made under the same conditions, but without the isobutyl-2-methyl-4-pentenoate prepared according to the process of Example III in the concentrate, it is found to have an inferior strawberry flavor.

EXAMPLE IX

The propylene glycol solution of the concentrate as prepared in Example VIII is added to a simple syrup at the rate of 1/8 oz. per gallon of syrup. The syrup is acidified by the addition of 1.5 oz. of 50% aqueous citric acid solution to each gallon of syrup. A carbonated beverage is prepared by admixing one oz. of the flavored, acidified syrup with 5 oz. of carbonated water. The beverage so prepared has an excellent fresh strawberry flavor, and is found to be markedly superior to a beverage prepared in the same manner but without the isobutyl-2-methyl-4-pentenoate prepared according to the process of Example III.

EXAMPLE X

The flavor concentrate prepared in Example VII is admixed with gum arabic and in the proportion of 7 lb. of concentrate to 28 lbs. of gum arabic in 65 lbs. of water, and the aqueous mixture of spray-dried. The flavor concentrate-carrier combination so obtained is then added to a gelatin dessert mix in the ratio of 1 oz. of spray-dried material to 100 lbs. of dessert mix powder. The gelatin dessert produced from the mix has an excellent strawberry flavor and is markedly superior to a gelatin dessert prepared in the same manner without the isobutyl-2-methyl-4-pentenoate prepared according to the process of Example III in the concentrate.

EXAMPLE XI

Strawberry Fragrance

The following mixture is prepared:

| Ingredient | Parts by Weight |
| --- | --- |
| Ethyl pelargonate | 5 |
| Ethyl laurate | 20 |
| Cinnamyl isobutyrate | 10 |
| Diacetyl 10% | 5 |
| Cuminic acetate | 10 |
| Peach aldehyde coeur | 50 |
| Ethyl isobutyrate | 100 |
| Ethyl isovalerate | 50 |
| Ethyl heptoate | 10 |
| para-Hydroxy phenyl butanone | 3 |
| Ethyl acetate | 2 |
| Beta Ionone | 10 |
| Palatone | 2 |
| Vanillin | 5 |
| Ethyl vanillin | 2 |
| Ethyl methyl phenyl glycidate | 75 |
| Isobutyl-2-methyl-4-pentenoate (Prepared according to the process of Example III) | 10 |
| Ethyl-2-methyl-4-pentenoate (Prepared according to the process of Example I) | 3 |

The ethyl-2-methyl-4-pentenoate, prepared according to the process of Example I, imparts the extreme green, sweet topnote to this strawberry fragrance. The isobutyl-2-methyl-4-pentenoate, prepared according to the process of Example III, imparts a green, tart, seed note to the strawberry aroma.

EXAMPLE XII

Tobacco Formulation

A tobacco mixture is produced by admixing the following materials:

| Ingredient | Parts by Weight |
| --- | --- |
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

Cigarettes are prepared from this tobacco.
The following flavor formulation is prepared:

| Ingredient | Parts by Weight |
| --- | --- |
| Ethyl butyrate | .05 |
| Ethyl valerate | .05 |
| Maltol | 2.00 |
| Cocoa extract | 26.00 |
| Coffee extract | 10.00 |
| Ethyl alcohol | 20.00 |
| Water | 41.90 |

The above-stated tobacco flavor formulation is applied at the rate of 0.1% to all of the cigarettes produced using the above tobacco formulation. Half of the cigarettes are then treated with 100 and 200 ppm of 2-methyl-4-pentenoic acid produced according to the process of Example II. The control cigarettes not containing the 2-methyl-4-pentenoic acid produced according to the process of Example II and the experimental cigarettes which contain the 2-methyl-4-pentenoic acid produced according to the process of Example II are evaluated by paired comparison and the results are as follows:

The experimental cigarettes are found to be, on smoking, more aromatic in aroma.

In the smoke, the experimental cigarettes are found to be more aromatic, sweeter, more bitter, less harsh in the mouth and throat and leave a slight sweet chemical mouth coating effect similar to Turkish tobacco. All cigarettes are evaluated for smoke flavor with a 20 mm cellulose acetate filter.

The 2-methyl-4-pentenoic acid produced according to the process of Example II enhances the tobacco-like taste and aroma of the blended cigarette and gives the cigarette a Turkish-like character.

EXAMPLE XIII

Preparation of Soap Composition

One hundred grams of soap chips are mixed with one gram of the perfume composition of Example XI until a substantially homogeneous composition is obtained. The perfumed soap composition manifests an excellent strawberry character with a green, sweet, tart and seed nuances.

EXAMPLE XIV

Preparation of a Detergent Composition

A total of 100 g. of a detergent powder is mixed with 0.15 g. of the perfume composition of Example XI until a substantially homogeneous composition is obtained. This composition has an excellent strawberry fragrance.

EXAMPLE XV

Preparation of a Cosmetic Powder Composition

A cosmetic powder is prepared by mixing in a ball mill, 100 g. of talcum powder with 0.25 g. of ethyl-2-methyl-4-pentenoate prepared according to Example I. It has an excellent sweet, green, strawberry aroma.

EXAMPLE XVI

Perfumed Liquid Detergent

Concentrated liquid detergents with a fruity, chamomile odor are prepared containing 0.10%, 0.15% and 0.20% of isobutyl-2-methyl-3-pentenoate prepared according to Example III. They are prepared by adding and homogeneously mixing the appropriate quantity of isobutyl-2-methyl-4-pentenoate in the liquid detergent. The detergents all possess a green, tart, strawberry fragrances, the intensity increasing with greater concentrations of isobutyl-2-methyl-4-pentenoate.

EXAMPLE XVII

Preparation of a Cologne and Handkerchief Perfume

Ethyl-2-methyl-4-pentenoate prepared according to the process of Example I is incorporated in a cologne at a concentration of 2.5% in 85% aqueous ethanol; and into a handkerchief perfume at a concentration of 20% (in 95% aqueous ethanol). A distinct and definite sweet, green, strawberry fragrance is imparted to the cologne and to the handkerchief perfume.

EXAMPLE XVIII

Preparation of a Cologne and Handkerchief Perfume

The composition of Example XI is incorporated in a cologne at a concentration of 2.5% in 85% aqueous ethanol; and into a handkerchief perfume at a concentration of 20% (in 95% aqueous ethanol). The use of the high 2-methyl-4-pentenoic acid esters in the composition of Example XI affords a distinct and definite strong strawberry aroma with sweet, green, tart and seed notes to the handkerchief perfume and cologne.

EXAMPLE XIX

Preparation of Soap Composition

One hundred grams of soap chips are mixed with one gram of isobutyl-2-methyl-4-pentenoate until a substantially homogeneous composition is obtained. The perfume soap composition manifests an excellent strawberry aroma with a green, tart note.

EXAMPLE XX

Preparation of a Detergent Composition

A total of 100 g. of a detergent powder is mixed with 0.15 g. of the isomer mixture of ethyl-2-methyl-4-pentenoate of Example I until a substantially homogeneous composition is obtained. This composition has an excellent strawberry aroma with a sweet, green note.

EXAMPLE XXI

Preparation of a Cosmetic Powder Composition

A cosmetic powder is prepared by mixing in a ball mill 100 g. of talcum powder with 0.25 g. of ethyl-2-methyl-4-pentenoate prepared according to Example I. It has an excellent sweet, green, strawberry character.

EXAMPLE XXII

Tobacco Flavor Formulation and Tobacco

A tobacco mixture is produced by admixing the following materials:

| Ingredient | Parts by Weight |
| --- | --- |
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

Cigarettes are prepared from this tobacco.

The following flavor formulation is prepared:

| Ingredient | Parts by Weight |
| --- | --- |
| Ethyl butyrate | .05 |
| Ethyl valerate | .05 |
| Maltol | 2.00 |
| Cocoa extract | 26.00 |
| Coffee extract | 10.00 |
| Ethyl alcohol (95% aqueous) | 20.00 |
| Water | 41.90 |

The above-stated tobacco flavor formulation is applied at the rate of 0.1% to all of the cigarettes produced using the above tobacco formulation. Half of the cigarettes are then treated with 100 or 200 ppm of the mixture containing ethyl-2-methyl-4-pentenoate produced according to the process of Example I.

The control cigarettes not containing the ethyl-2-methyl-4-pentenoate produced according to the process of Example I and the experimental cigarettes which do contain the ethyl-2-methyl-4-pentenoate produced according to the process of Example I are evaluated by paired comparison, and the results are as follows:

In aroma, the cigarettes containing the mixture having ethyl-2-methyl-4-pentenoate have been found to be more aromatic.

In smoke flavor, the cigarettes containing the mixture having ethyl-2-methyl-4-pentenoate are more aromatic, more sweet, more bitter, slightly less harsh in the mouth and throat and leave a slight, sweet chemical mouth-coating effect similar to Turkish tobacco.

In summary, the mixture having ethyl-2-methyl-4-pentenoate enhances the tobacco-like taste and aroma of a blend cigarette and imparts to that cigarette a Turkish-like character in smoke flavor.

EXAMPLE XXIII

Lavender Fragrance

The following mixture is prepared:

| Ingredient | Parts by Weight |
| --- | --- |
| Linalool | 300 |
| Linalyl Acetate | 400 |
| Turpentine | 30 |
| Methyl hexyl ketone | 3 |
| n-Hexanol | 2 |
| Ocimene | 10 |
| Amyl vinyl carbinol | 3 |
| Amyl vinyl acetate | 40 |
| Caryophyllene | 30 |
| Ethyl amyl ketone | 10 |
| Terpineol | 30 |
| Eucalyptol | 20 |
| Borneol | 10 |
| Camphor | 20 |
| Coumarin | 5 |
| Geraniol | 10 |
| Geranyl acetate | 15 |
| n-Hexyl-2-methyl-4-pentenoate (prepared according to the process of Example IV) | 10 |

The mixture containing n-hexyl-2-methyl-4-pentenoate prepared according to the process of Example IV imparts the fruity, fatty, middle note fullness to this lavender fragrance.

EXAMPLE XXIV

Preparation of Soap Composition

One hundred grams of soap chips are mixed with one gram of the perfume composition of Example XXIII until a substantially homogeneous composition is obtained. The perfumed soap composition manifests an excellent lavender character with a fruity, fatty nuance.

EXAMPLE XXV

Preparation of a Detergent Composition

A total of 100 g. of a detergent powder is mixed with 0.15 g. of the perfume composition of Example XXIII until a substantially homogeneous composition is obtained. This composition has an excellent lavender fragrance.

EXAMPLE XXVI

Preparation of a Cosmetic Powder Composition

A cosmetic powder is prepared by mixing in a ball mill 100 g. of talcum powder with 0.25 g. of n-hexyl-2-methyl-4-pentenoate prepared according to Example IV. It has an excellent green, floral aroma.

EXAMPLE XXVII

Perfumed Liquid Detergent

Concentrated liquid detergents with a fruity, chamomile odor are prepared containing 0.10%, 0.15% and 0.20% of the mixture having n-hexyl-2-methyl-4-pentenoate prepared according to Example IV. They are prepared by adding and homogeneously mixing the appropriate quantity of n-hexyl-2-methyl-4-pentenoate in the liquid detergent. The detergents all possess a green, floral fragrance, the intensity increasing with greater concentrations of n-hexyl-2-methyl-4-pentenoate.

EXAMPLE XXVIII

Preparation of a Cologne and Handkerchief Perfume

The composition of Example XXIII is incorporated in a cologne at a concentration of 2.5% in 85% aqueous ethanol; and into a handkerchief perfume at a concentration of 20% (in 95% aqueous ethanol). The use of the mixture n-hexyl-2-methyl-4-pentenoate in the composition of Example XXIII affords a distinct and definite strong lavender aroma to the handkerchief perfume and cologne.

EXAMPLE XXIX

Preparation of Soap Composition

One hundred g. of soap chips are mixed with one gram of n-hexyl-2-methyl-4-pentenoate of Example IV until a substantially homogeneous composition is obtained. The perfume soap composition manifests an excellent green, floral aroma.

EXAMPLE XXX

Preparation of a Detergent Composition

A total of 100 g. of a detergent powder is mixed with 0.15 g. of n-hexyl-2-methyl-4-pentenoate of Example IV until a substantially homogeneous composition is obtained. This composition has an excellent green, floral aroma.

What is claimed is:

1. A fragrance modifying composition comprising a compound having the structure:

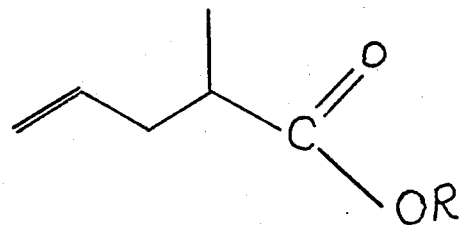

wherein R is hydrogen or one of $C_2$—$C_6$ alkyl and an auxiliary perfume ingredient.

2. A perfume composition comprising a compound having the structure:

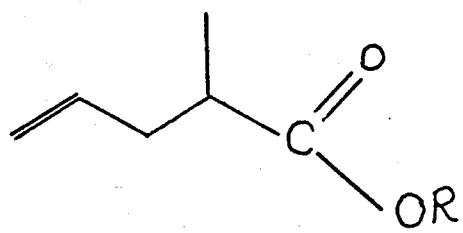

wherein R is hydrogen or one of $C_2$—$C_6$ alkyl and at least one adjuvant selected from the group consisting of natural perfume oil, synthetic perfume oil, alcohols, aldehydes, ketones, esters and lactones.

3. A cologne composition comprising ethanol, water and a compound having the structure:

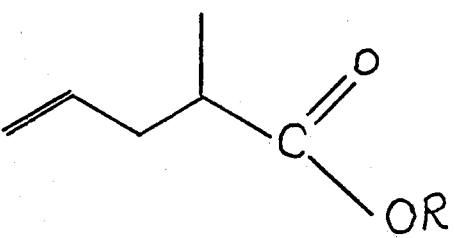

wherein R is hydrogen or one of $C_2$—$C_6$ alkyl.

* * * * *